(12) United States Patent
Roundy et al.

(10) Patent No.: US 11,163,875 B1
(45) Date of Patent: Nov. 2, 2021

(54) DISCOVERY OF COMPUTER SYSTEM INCIDENTS TO BE REMEDIATED BASED ON CORRELATION BETWEEN SUPPORT INTERACTION DATA AND COMPUTER SYSTEM TELEMETRY DATA

(71) Applicant: CA, INC., San Jose, CA (US)

(72) Inventors: Kevin A. Roundy, El Segundo, CA (US); Mahmood Sharif, Pittsburgh, PA (US); Matteo Dell'Amico, Antibes (FR); Christopher Gates, Culver City, CA (US); Daniel Kats, Culver City, CA (US); Dong Chung, Playa Vista, CA (US)

(73) Assignee: CA, INC., New York, NY (US)

( * ) Notice: Subject to any disclaimer, the term of this patent is extended or adjusted under 35 U.S.C. 154(b) by 384 days.

(21) Appl. No.: 16/362,369

(22) Filed: Mar. 22, 2019

(51) Int. Cl.
  *G06F 21/55* (2013.01)
  *G06F 21/56* (2013.01)

(52) U.S. Cl.
  CPC ............ *G06F 21/554* (2013.01); *G06F 21/56* (2013.01); *G06F 2221/034* (2013.01)

(58) Field of Classification Search
  None
  See application file for complete search history.

(56) References Cited

U.S. PATENT DOCUMENTS

| 9,590,880 | B2 * | 3/2017 | Ashby | H04L 43/08 |
| 10,521,584 | B1 * | 12/2019 | Sharifi Mehr | H04L 63/1425 |
| 2014/0337072 | A1 * | 11/2014 | Tamblyn | G06Q 10/06311 |
| | | | | 705/7.13 |
| 2016/0164903 | A1 * | 6/2016 | Murynets | H04L 63/1433 |
| | | | | 726/25 |
| 2019/0065297 | A1 * | 2/2019 | Eichelberger | G06F 11/0709 |
| 2020/0242623 | A1 * | 7/2020 | Savir | G06N 3/0454 |
| 2020/0296055 | A1 * | 9/2020 | Salim | H04L 47/827 |

OTHER PUBLICATIONS

Zong Fu Chua, "Using Windows Crash Dumps for Remote Incident Identification," SANS Institute, Information Security Reading Room, 2019, <https://www.sans.org/reading-room/whitepapers/forensics/windows-crash-dumps-remote-incident-identification-36012>, 45 pages.

(Continued)

*Primary Examiner* — Christopher C Harris
(74) *Attorney, Agent, or Firm* — Foley & Lardner LLP

(57) ABSTRACT

The present disclosure relates to using correlations between support interaction data and telemetry data to discover emerging incidents for remediation. One example method generally includes receiving a corpus of support interaction data and a corpus of telemetry data. Topics indicative of underlying problems experienced by users of an application are extracted from the corpus of support interaction data. A topic having a rate of appearance in the support interaction data above a threshold value is identified. A set of telemetry data relevant to the topic is extracted from the corpus of telemetry data, and a subset of the relevant set of telemetry data having a frequency in the relevant set of telemetry data above a second threshold value is identified. The topic and the subset of telemetry data are correlated to an incident to be remediated, and one or more actions are taken to remedy the incident.

20 Claims, 4 Drawing Sheets

(56) References Cited

OTHER PUBLICATIONS

Crash Dump Analysis, Microsoft, May 30, 2018, 8 pages, <https://docs.microsoft.com/en-us/windows/desktop/dxtecharts/crash-dump-analysis>.

Yang Liu, et al., "Cloudy with a Chance of Breach: Forecasting Cyber Security Incidents," 24th USENIX Security Symposium, Aug. 12-14, 2015, 17 pages, <https://www.usenix.org/system/files/conference/usenixsecurity15/sec15-paper-liu.pdf>.

Telemetry and Threat Intellligence Sharing, techDOCS, Palo Alto, May 22, 2019, 6 pages, <https://www.paloaltonetworks.com/documentation/80/pan-os/newfeaturesguide/content-inspection-features/telemetry-and-threat-intelligence-sharing>.

Marti Motoyama, et al., Measuring Online Service Availability Using Twitter, Dept. of Computer Science and Engineering, 9 pages, <https://www.usenix.org/legacy/event/wosn/tech/full_papers/Motoyama.pdf>.

Carl Sabottke et al., Vunerability Disclosure in the Age of Social Media: Exploiting Twitter for Predicting Real-World Exploits, University of Maryland, 16 pages, <http://legacydirs.umiacs.umd.edu/~tdumitra/papers/USENIX-SECURITY-2015.pdf>.

Grant Williams, et al., "Mining Twitter Feeds for Software User Requirements," 2017 IEEE 25th International Requirements Engineering Conference, 10. pages.

* cited by examiner

DISCOVERY OF COMPUTER SYSTEM INCIDENTS TO BE REMEDIATED BASED ON CORRELATION BETWEEN SUPPORT INTERACTION DATA AND COMPUTER SYSTEM TELEMETRY DATA

BACKGROUND

Field

Embodiments presented herein generally relate to computer incident analysis systems, and more specifically to using correlations between customer support interaction data and computer system telemetry data to discover previously unknown incidents to be remediated on computer systems.

Description of the Related Art

Computer performance and security incidents regularly arise from various underlying issues. For example, updates to a software application may be deployed with errors that did not arise during testing but are causing various performance or usability issues for users of the software application. Such performance issues may range from annoying computer behaviors to slowing down a computer system to rendering the computer system inoperable. In another example, security incidents may arise from new strains of malicious software (e.g., viruses, worms, Trojan horses, etc.), potentially causing issues similar to those caused by software application updates. Because new strains of malicious software may not have been seen in the wild previously, signatures or other information that can be used to detect the presence of such malicious software and perform remedial action on computer systems infected with such malicious software may not exist. Still further, remedial actions thought to effectively remediate problems caused by software updates or malicious software may fail to actually remediate those problems.

Providers of a software application generally provide support mechanisms to aid a user of the software application in troubleshooting problems that arise while the user is interacting with the software application. These support mechanisms may include forums or message boards in which users of the software application can exchange information to troubleshoot a problem, live textual chat systems for a user to interact with technical support staff, telephone support systems, and the like. While support mechanisms may be useful in aiding individual users in troubleshooting problems on a computer system, individualized remediation of these problems may not reveal trends or underlying issues that are causing users to request support in troubleshooting a problem on a computer system.

Thus, techniques are needed to rapidly discover and remediate emerging incidents on computer systems.

SUMMARY

One embodiment of the present disclosure includes a computer-implemented method for discovering incidents across a plurality of computing systems for remediation based on support interaction and telemetry data. The method generally includes receiving a corpus of support interaction data from a plurality of users and receiving a corpus of telemetry data from the plurality of computing systems. A plurality of topics indicative of problems experienced by the plurality of users is extracted from the corpus of support interaction data. A topic in the plurality of topics is identified, the topic having a rate of appearance in the corpus of support interaction data above a threshold value. A relevant set of telemetry data is extracted from the corpus of telemetry data, wherein the relevant set of telemetry data comprises telemetry data generated by computing devices associated with users generating support interaction data including the identified topic. From the relevant set of telemetry data, a subset of the relevant set of telemetry data is identified. The subset generally has a rate of appearance in the relevant set of telemetry data above a second threshold value. The topic and the subset of the relevant set of telemetry data are correlated to an incident to be remediated, and one or more actions are taken to remedy the incident to be remediated.

Another embodiment of the present disclosure includes a system having a processor and a memory storing a program, which, when executed on the processor, performs an operation for discovering incidents across a plurality of computing systems for remediation based on support interaction and telemetry data. The operation generally includes receiving a corpus of support interaction data from a plurality of users and receiving a corpus of telemetry data from the plurality of computing systems. A plurality of topics indicative of problems experienced by the plurality of users is extracted from the corpus of support interaction data. A topic in the plurality of topics is identified, the topic having a rate of appearance in the corpus of support interaction data above a threshold value. A relevant set of telemetry data is extracted from the corpus of telemetry data, wherein the relevant set of telemetry data comprises telemetry data generated by computing devices associated with users generating support interaction data including the identified topic. From the relevant set of telemetry data, a subset of the relevant set of telemetry data is identified. The subset generally has a rate of appearance in the relevant set of telemetry data above a second threshold value. The topic and the subset of the relevant set of telemetry data are correlated to an incident to be remediated, and one or more actions are taken to remedy the incident to be remediated.

Yet another embodiment provides a computer-readable storage medium having instructions, which, when executed on a processor, perform an operation for discovering incidents across a plurality of computing systems for remediation based on support interaction and telemetry data. The operation generally includes receiving a corpus of support interaction data from a plurality of users and receiving a corpus of telemetry data from the plurality of computing systems. A plurality of topics indicative of problems experienced by the plurality of users is extracted from the corpus of support interaction data. A topic in the plurality of topics is identified, the topic having a rate of appearance in the corpus of support interaction data above a threshold value. A relevant set of telemetry data is extracted from the corpus of telemetry data, wherein the relevant set of telemetry data comprises telemetry data generated by computing devices associated with users generating support interaction data including the identified topic. From the relevant set of telemetry data, a subset of the relevant set of telemetry data is identified. The subset generally has a rate of appearance in the relevant set of telemetry data above a second threshold value. The topic and the subset of the relevant set of telemetry data are correlated to an incident to be remediated, and one or more actions are taken to remedy the incident to be remediated.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
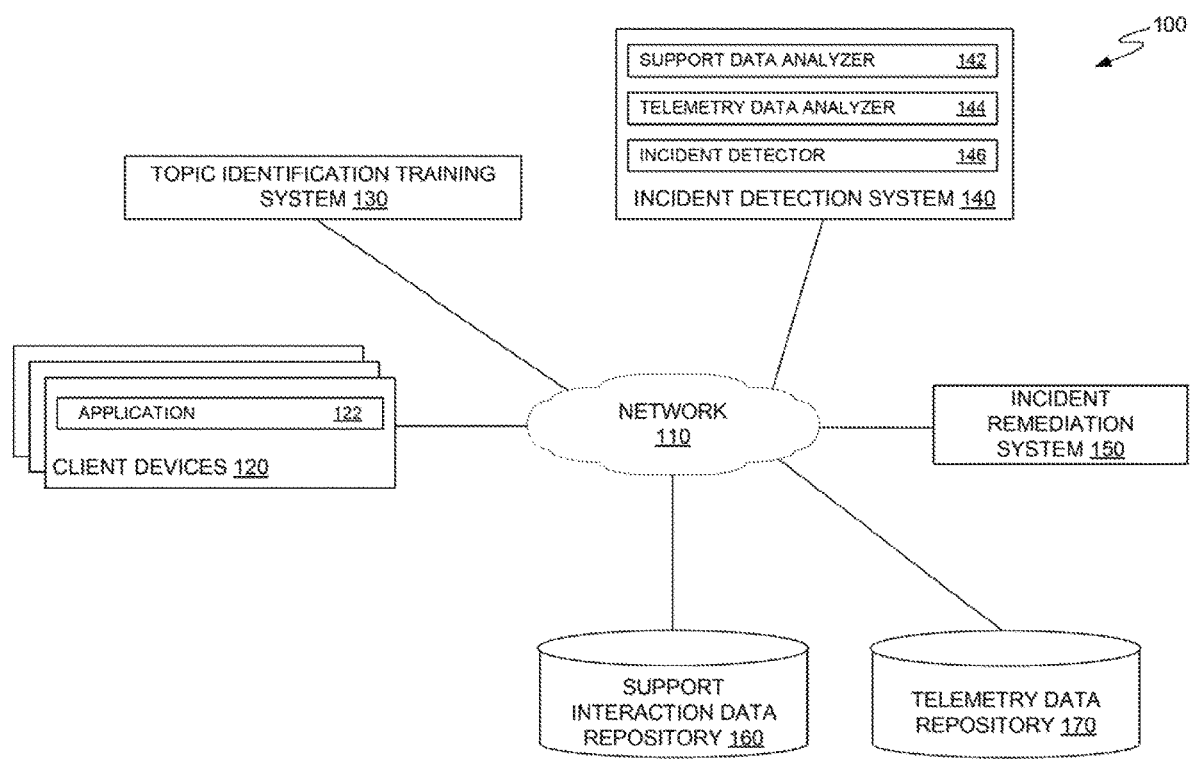
FIG. 1 illustrates an example of a networked computing environment in which customer support interaction data is correlated with computer system telemetry data to discover incidents for remediation, according to one embodiment.

New issues regularly arise on computer systems for which remediation procedures are unknown. These issues may include non-security-related issues, such as degraded system performance or usability issues arising from new applications or updates to existing applications. In some cases, these issues may include security-related issues. For example, new variations of known malware (e.g., viruses, worms, Trojan horses, etc.) and new types of malware may not be detected using existing malware detection techniques. Further issues may arise from attempts to remove malware from a computer system. For example, some malware may appear to be removed when computer security applications remove files related to the malware from an affected computer system but may reappear when the affected computer system is rebooted.

When issues arise on these computer systems, the users of these computer systems may request support from other users of a given application or invoke live support sessions with technical support staff associated with the provider of the application. Typically, abnormal volumes of support requests from users of a given software application may indicate that an issue has emerged to be investigated and remediated across a plurality of computing systems. However, numerical metrics indicating that an issue has emerged for investigation and remediation may not indicate what the issue to be investigated is, what the symptoms of the issue are, and who may be responsible for investigating the issue. Many computer systems, however, may provide telemetry data back to the provider of a software application. The term "telemetry data" generally refers to information provided by an application about a computer system on which an application executes and/or the application itself. This telemetry data may, for example, indicate the state of the software application, how users have interacted with the software application, actions that the software application has performed or failed to perform, and the like. This telemetry data may be used to identify the source of an issue emerging on a plurality of computing systems. However, the telemetry data alone may not indicate that an issue has emerged for investigation and remediation.

In an example, a provider of an application may collect telemetry data from an application executing on a computing device (e.g., a desktop computer, laptop computer, smartphone, tablet, etc.). The application may transmit the telemetry data to the provider of the application periodically or in response to various events that occur on the computing device. The provider of the application may additionally collect user interaction data (e.g., from transcripts of support sessions, community help systems, etc.). An incident identification system uses some of the collected user interaction data to train one or more machine learning models to identify a topic in the user interaction data and a problem related to the identified topic. Using the trained machine learning models, the incident identification system identifies, from subsequently received user interaction data, trending issues that users experience while using the application on their computing devices. When the system identifies an issue having an anomalous increase in frequency in the user interaction data relative to a baseline, or expected, frequency, the system can examine the telemetry data to find a corresponding increase in the frequency at which certain types of telemetry are reported by the computing devices. Based on the correlation between the identified issue and the telemetry data having a corresponding increase in reporting frequency, the incident identification system can determine the cause of the identified issue and take action to initiate remediation of the identified issue. These actions may include notifying developers of the application that an issue has emerged for remediation and/or identifying, from the telemetry data, a cause of the issue and remedial actions to perform to remedy the issue.

Embodiments of the present disclosure describe techniques for correlating support interaction data from users of a software application with telemetry data from the software application to discover incidents to be investigated and remediated across a plurality of computer systems on which the software application is deployed. As discussed in further detail herein, embodiments of the present disclosure may discover incidents to be investigated and remediated across a plurality of computing systems by correlating abnormal volumes of user support interaction referencing a specific topic with corresponding abnormal volumes of particular types of telemetry data associated with the referenced topic. Because abnormal volumes of user support sessions referencing a given topic may generally be accompanied by abnormal volumes particular types of telemetry data, identifying and correlating these abnormal volumes in topics in user support interaction and telemetry data may facilitate rapid identification of emerging issues for remediation and actions to perform on one or more computer systems to remediate the identified issues.

FIG. 1 illustrates an example networked system in which correlations between topics identified in support interaction data and telemetry data are used to identify and remediate emerging issues on a plurality of computing systems, according to an embodiment. As illustrated, networked system 100 includes a plurality of client devices 120, a topic identification training system 130, an incident detection system 140, an incident remediation system 150, a support interaction data repository 160, and a telemetry data repository 170, connected via network 110.

Client devices 120 are illustrative of a variety of connected devices that may be used by users to generate support interaction data with a provider of an application 122 and telemetry data related to the client device 120 and/or application 122 for use by incident detection system 140 to discover emerging issues related to an application 122, as discussed in further detail herein. Client device 120 may be, for example, a desktop computer, a laptop computer, a tablet device, a mobile phone, or other computing device with networked communications capabilities. As illustrated, client device 120 includes an application 122. Application 122 generally represents applications that a user can interact with in order to perform a variety of actions on client device 120. For example, application 122 may include security applications that protect client device 120 and data stored on client device 120 from malicious software (e.g., antivirus software, firewall software, data loss prevention software, and the like), information protection software, data archival software, productivity software, etc. In some embodiments, application 122 may further expose, to a user of the application 122, a support interface that allows a user to initiate a support session with other users of application 122 or a provider of application 122. Information provided through the support interface may be committed to supporting interaction data repository for use in identifying abnormal increases in topics referenced in user support sessions and correlating these increases to corresponding increases in particular types of telemetry data to discover previously unknown issues to be remediated, as discussed in further detail herein.

Applications 122 may regularly transmit telemetry data about the client device 120 and/or the applications 122 to a provider of an application 122 for storage in telemetry data repository 170 and subsequent correlation to topics identified in user support interaction data, as discussed in further detail below. Telemetry data related to an application 122 may include, for example, information identifying actions performed by the application 122 (e.g., for a security application, timestamped activity logs identifying when malware scans were initiated on client device 120, if malware was found on client device 120, and remedial actions performed by the application on client device 120), information identifying errors encountered during application runtime (e.g., timestamped error logs identifying functions that failed to execute properly, failed assertions or other debug traces in the application, etc.), and the like. In some embodiments, the telemetry data may include, separately or in conjunction with the information identifying actions performed by the application 122, other information about the client device 120 that may be used to identify common features across systems experiencing the same issues. This information may include, for example, the hardware configuration of a client device 120 (e.g., processor, chipset, hardware accelerators, peripherals, etc.), the software configuration of the client device 120 (e.g., operating system, web browser, applications installed on the client device 120), user activity performed on client device 120 (e.g., websites accessed on client device 120, files downloaded to client device 120, executable files launched on client device 120, etc.), user activity within application 122 and/or other applications executing on client device 120 (e.g., current application state, recent application states, functions invoked by the user of application 122, features used by the user of application 122, etc.) and the like.

Topic identification training system 130 is generally configured to train a topic identifier to identify topics referenced in support interaction data from a plurality of users for use in identifying previously unknown issues to be remediated and deploy the trained topic identifier to incident detection system 140. To train the topic identifier, topic identification training system 130 can use a corpus of support interaction data as a training data set. The corpus of support interaction data may be defined as a priori from historical support interaction data stored at support interaction data repository 160. The training data set may include textual content from support sessions between a user of application 122 and support staff associated with a provider of application 122 and may further include content from a support community of users of the application 122. In some embodiments, where support interaction data to be included in the training data set is stored as audio data (e.g., recorded calls between users of application 122 and support staff associated with the provider of application 122), topic identification training system 130 can convert the audio data to textual transcripts of the audio data using various voice-to-text techniques. For example, automated transcription techniques may be used to perform an initial conversion of audio recordings of support interactions to be included in the training data set into a textual transcript, and the textual transcripts may be edited manually to correct the automatically generated transcript.

Topic identification training system 130 can use various techniques to train the topic identifier to identify relevant words in a corpus of support interaction data. These techniques may include unsupervised learning techniques, such as the use of word embedding models, to learn how to identify topics included in support interaction data. In one example, the doc2vec model and continuous bag of words architecture may be used to learn the identification of topics included in support interaction data from the training data set discussed above. Other types of machine learning models, such as a Latent Dirichlet Allocation model or neural network-based classifiers, may also be used to train the topic identifier to identify relevant words in the corpus of support interaction data.

Topic identification training system 130 may further use semi-supervised or supervised learning techniques to label support interaction data with information about the underlying problem for which a user has initiated a support session. For example, each entry in the training data set may be labeled with one or more tags identifying a type of problem associated with a transcript or textual information from a specific support session. These tags may include, for example, information about warnings or errors issued by an application 122, network connectivity issues on client device 120, malware infections on a client device 120, malicious advertising directing a user of a client device 120 to scam or other websites known to be malicious, and the like. Using the training data of transcripts of a support session and an associated label identifying the underlying problem for which the support session was initiated, topic identification training system 130 can train a topic identifier to extract relevant keywords from a transcript of a support session for an application 122 and predict the underlying problem for which the support session was initiated. In some embodiments, the topic identification model may include one or more softmax regressors layered on top of a word extraction model (e.g., a doc2vec model, TaxoGen clustering algorithm, Latent Dirichlet Allocation model, neural networks, or other natural language processing techniques). After topic identification training system 130 trains the topic identifier, topic identifier deploys the topic identifier to incident detection system 140 (e.g., to support data analyzer 142 in the incident detection system 140).

Incident detection system 140 generally uses a trained topic identifier to identify anomalous increases in references to a particular topic in support interaction data related to an application 122 and telemetry data from client devices 120 executing application 122 to discover incidents on these client devices 120 to be remediated. As illustrated, incident detection system 140 includes a support data analyzer 142, a telemetry data analyzer 144, and an incident detector 146.

Support data analyzer 142 generally extracts a plurality of topics indicative of underlying problems experienced by users of application 122 from a corpus of support interaction data using the topic identifier trained by topic identification training system 130. The corpus of support interaction data may be defined as a sliding window of support interaction data stored in support interaction data repository 160. For example, support data analyzer may be configured to periodically retrieve support interaction data from support interaction data repository 160 encompassing support interaction data that has been committed to support interaction data repository 160 during a time window starting at the time of at which support interaction data repository 160 was previously analyzed and a current time. In some embodiments, the time window may be configured to include support interaction data committed to support interaction data repository 160 for an amount of time prior to the previous analysis of the support interaction data by support data analyzer 142. By including some amount of overlap between the support interaction data previously analyzed and the support interaction data currently analyzed by support data analyzer 142, support data analyzer 142 can discover issues that may have begun at the tail end of the previous time window but was not discovered during an analysis of support interaction data for the previous time window.

Generally, support data analyzer 142 outputs, for a given input of a corpus of support interaction data, a label associated with each entry in the corpus of support interaction data (e.g., each transcript of a support session included in the corpus of support interaction data). This label may be generated by first extracting one or more relevant keywords from a textual representation of a support session (e.g., a transcript of a telephonic support session, a forum thread from a support community associated with the application 122, etc.) using a word extraction component of the topic identification model (e.g., using the doc2vec portion of a trained topic identifier in which regressors are layered on top of a doc2vec representation of a transcript of a support session). After the relevant keywords are extracted from a textual representation of a support session, support data analyzer 142 can identify topics to associate with the relevant keywords based on the training performed by topic identification training system 130 using the tagged support interaction data.

Based on the identified topics, support data analyzer 142 can generate a distribution of the topics in the corpus of support interaction data and use the distribution to identify emerging issues on the client devices 120. To generate the distribution, support data analyzer 142 can, for example, generate a list of topics identified by the trained topic identification model and a number of appearances in the corpus of support interaction data for each topic. Based on the list of topics, the frequency at which the topics are referenced in the corpus of support interaction data, and, in some embodiments, historical trends related to the frequency at which topics are referenced in the support interaction data, support data analyzer 142 can identify one or more topics having a frequency of appearance exceeding a threshold value. The threshold value for a topic may be based on historical frequency at which the topic appears in support interaction data repository 160. For example, support data analyzer 142 can flag a topic for further analysis (e.g., analysis of telemetry related to the topic) if the frequency at which the topic appears in the corpus of support interaction data exceeds the historical frequency at which the topic appears in support interaction data repository 160 by a predetermined amount.

Telemetry data analyzer 144 generally uses the topics identified by support data analyzer 142 for further analysis to obtain and analyze telemetry data provided by client devices 120 related to the identified topics. The analysis of the telemetry data may identify, for example, subsets of client devices having properties that are correlated to an increased probability that a user of the application 122 would initiate a support session to obtain help in remedying an incident on client device 120. To analyze telemetry data, telemetry data analyzer 144 determines, for each topic, a type of telemetry to obtain from telemetry data repository 170 for the time period over which support data analyzer 142 analyzed transcripts from support interaction data repository 160. The type of telemetry to obtain from telemetry data repository 170 may be determined a priori based on mappings between topics identified by support data analyzer 142 and types of telemetry. For example, topics about software performance issues (e.g., where a topic indicates that a user has initiated a support session to resolve a slowdown caused by or experienced within an application 122) or problems with broken features in an application 122 may be correlated with, for example, telemetry data including debug information reported by application 122, failed assertions reported by application 122, and the like. In contrast, topics about malware infections on a client device 120 may be correlated with telemetry data comprising results of malware scans on client device 120, network activity data from client device 120, files downloaded and/or executed on client device 120, and the like. Other telemetry data that may be used to identify issues for remediation may include, for example, process lists, filename and file metadata lists, system and event log data, recently downloaded files and other information that may be used to correlate support interactions with an underlying problem to be remedied. Further, the telemetry to obtain from telemetry data repository 170 may include telemetry data generated by computing devices associated with users generating support interaction data including an identified topic.

In some embodiments, telemetry data analyzer 144 may further analyze telemetry data provided by client devices 120 and related to an identified topic based on one or more additional dimensions. These dimensions may be used to divide an overall universe of telemetry data into a plurality of groups of telemetry data, with each group of telemetry data being associated with different types of users. For example, telemetry data analyzer 144 may be divided into different groups based on one or more of operating system installed on client device 120, the default web browser installed on client device 120, and other dimensions which may affect the likelihood of a user invoking a support session. In some cases, these dimensions may be used to further cluster users, for example, based on a geographic regions in which users are located, a time window during which the client device 120 associated with a user-generated specific telemetry data, and the like. These additional dimensions may be used, for example, to reduce the amount of telemetry data to be analyzed based on when the telemetry data was reported from a client device 120 and the location of the client devices 120 that reported the telemetry data, which may allow for focused analysis of geographically isolated incidents. In some embodiments, telemetry data analyzer 144 may analyze telemetry data provided by client devices 120 based on the geographic locations of users who initiated support sessions related to the identified topic, which may reduce the size of the data set to be analyzed by telemetry data analyzer 144.

In analyzing the subset of telemetry data relevant to an identified topic extracted from telemetry data repository 170, telemetry data analyzer 144 can examine the frequency at which client devices reported the relevant telemetry data against a baseline value to identify increases in telemetry reporting corresponding to the increases in the frequency at which support sessions referencing the identified topic are initiated by users of application 122. In some examples, telemetry data analyzer 144 can examine a probability of a particular type of telemetry being reported for a given set of dimensions (e.g., as discussed above, operating system, browser, installed applications, network connections, geographic location, etc.) characterizing the properties of a client device 120 reporting the telemetry data against the probability that the client device 120 having the given set of dimensions will not report telemetry data associated with the identified topic. If the probability that the client devices 120 having the given set of dimensions will report the particular type of telemetry exceeds a threshold value, telemetry data analyzer 144 can correlate the identified topic to the subset of telemetry data and provide both the identified topic and subset of telemetry data to incident detector 146 for further analysis. The threshold value may be set, for example, as an amount above a historical probability that client devices 120 having the given set of dimensions will report the particular type of telemetry associated with the identified topic, as a difference between the probabilities that client devices 120 having the given set of dimensions will or will not report the particular type of telemetry associated with the identified topic, and the like. The historical probability may be calculated based on telemetry data from time periods during which no anomalous increases in identified topics and corresponding telemetry data was detected.

In another example, telemetry data analyzer 144 can examine a frequency at which a particular type of telemetry is reported by client devices 120 having a given set of dimensions against a threshold frequency value. Telemetry data analyzer 144 can determine that a particular type of telemetry is associated with the identified issue, for example, if the frequency at which the particular type of telemetry is reported in the extracted subset of telemetry data associated with the identified issue exceeds a threshold value. The threshold value may be set, for example, as a baseline frequency at which the client devices 120 having the given set of dimensions report the particular type of telemetry. The baseline frequency may be calculated based on telemetry data from time periods during which no anomalous increases in identified topics and corresponding telemetry data was detected.

In some embodiments, the baseline values used to identify anomalous increases in the frequency at which particular types of telemetry are received may be adjusted based on a risk profile associated with different sets of dimensions associated with different client devices. The baseline values may be adjusted a priori based on knowledge about the relative likelihood of issues impacting client devices with particular configurations. For example, client devices 120 having a default web browser that is widely attacked may have a higher baseline rate of support interaction than client devices 120 having a default web browser that is not as widely attacked or has fewer vulnerabilities. By adjusting baseline values for different dimensions, telemetry data analyzer 144 can identify anomalous increases in reported telemetry, taking into account different expected rates of telemetry reporting for different types of systems.

Incident detector 146 generally receives an identified topic and a subset of a relevant set of telemetry data from one or more of support data analyzer 142 and/or telemetry data analyzer 144 for analysis. The subset of the relevant set of telemetry data generally includes telemetry data identified by telemetry data analyzer 144 as relevant to the identified topic and for which the rate at which the subset of the relevant set of telemetry data is received corresponds to an increase in references to the identified topic in support interaction data. Incident detector 146 analyzes the subset of the relevant set of telemetry data to identify a cause of the underlying problem associated with the identified topic in the support interaction data. For example, incident detector 146 can analyze the subset of the relevant set of telemetry data to identify one or more common data points included in the subset of the relevant set of telemetry data. The common data points may, for example, include a failed assertion, operations performed by application 122 on client device 120, commonly accessed network destinations (e.g., botnet command-and-control servers, data exfiltration points, etc.), commonly downloaded or executed files, updates performed on client device 120 with respect to application 122, and the like. Incident detector 146 can identify a probable cause of the underlying problem associated with the identified topic based on an inference that common data points in the reported telemetry from the client devices 120 indicates that the common data points is the probable cause of the underlying problem or is at least related to the underlying problem.

Based on the common data points identified in the subset of the relevant set of reported telemetry, incident detector 146 can identify the source of the underlying problem identified by the topic and where to route information about the underlying problem for further analysis and remediation. Incident detector 146 can use mappings between different types of telemetry to route the identified topic and the common data points to the appropriate system. For example, if the identified topic indicates an error in application 122 and the common data points include information about failed assertions or other debug information generated by application 122, incident detector 146 can determine that the incident is to be remediated by a development team associated with application 122 and route a notification of the identified topic and common data point to an incident remediation system 150 associated with a development team for application 122. In another example, if the identified topic indicates a malware infection detected by application 122 and the common data points include information about the client devices 120 generated by application 122, the identified topic and common data points may be routed to an incident remediation system 150 associated with a malware investigation team for analysis and potential remediation.

Incident remediation system 150 is generally representative of one or more computing systems that may be used to investigate an underlying problem associated with an issue identified by incident detection system 140. In some embodiments, incident remediation system 150 may be configured to automatically identify a root cause of the identified issue and remedial actions to be performed on client devices 120 to remedy the identified issue. For example, if the identified issue comprises software performance issues with application 122, incident remediation system 150 can determine whether an update was installed on or otherwise deployed to the client devices 120 that generated telemetry data associated with the identified software performance issues. Incident remediation system 150 can determine whether an update to application 122 was installed on the client devices 120 based on, for example, version and/or update history information included in telemetry data generated by the client devices 120. If the same update was installed on the client devices 120, incident remediation system 150 can determine that rolling client devices 120 to a previous version of application 122 would remediate the underlying problem associated with the identified software performance issues. Based on this determination, incident remediation system 150 can generate remediation instructions to roll back the update to application 122 and push the generated remediation instructions to client devices 120 for execution. In some embodiments, incident remediation system 150 can identify client devices to receive the generated remediation instructions by identifying client devices 120 that generated the telemetry data included in the subset of the relevant set of telemetry data and push the generated remediation instructions to the identified client devices 120.

In another example, incident remediation system 150 can receive a notification from incident detection system 140 and display the notification to one or more software developers or security investigators for further analysis. The notification may comprise a report identifying one or more common data points associated with the client devices 120 that transmitted the subset of the relevant set of telemetry data and an indication of a software application associated with the subset of the relevant set of telemetry data. In some embodiments, the notification may further include one or more file attachments related to the identified issue. For example, the notification may include a file downloaded on the client devices 120 that transmitted the subset of the relevant set of telemetry data. By including the file(s) that may be the probable cause of the identified issue or otherwise related to the identified issue, incident remediation system 150 can provide a probable malware file to security investigators for further analysis.

While topic identification training system 130, incident detection system 140, incident remediation system 150, support interaction data repository 160, and telemetry data repository 170 are illustrated as separate components in FIG. 1, it should be recognized by one of ordinary skill in the art that topic identification training system 130, incident detection system 140, incident remediation system 150, support interaction data repository 160, and telemetry data repository 170 may be implemented on any number of computing systems, either as one or more standalone systems or in a distributed environment.

Figure 2:
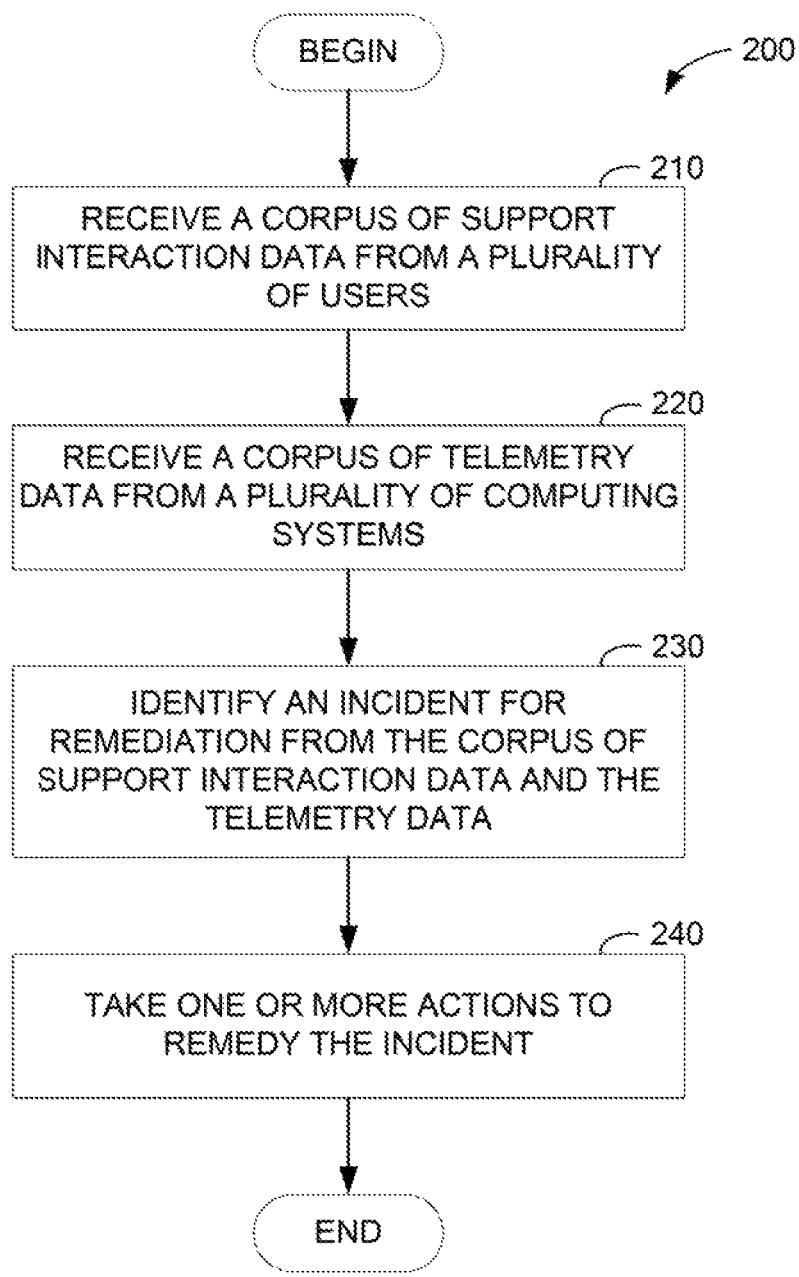
FIG. 2 illustrates operations for discovering an incident to be remediated on a plurality of computing systems based on customer support interaction data and computer system telemetry data, according to one embodiment.

FIG. 2 illustrates example operations 200 for discovering an incident to be remediated on a plurality of computing systems by correlating customer support interaction data and computer system telemetry data, according to an embodiment. As illustrated, operations 200 begin at block 210, where a system receives a corpus of support interaction data from a plurality of users. The support interaction data, as discussed, may include records retrieved from community support systems, audio recordings of support sessions between a user of an application 122 and support staff associated with a provider of application 122, transcripts of audio recordings of support sessions, and the like. In some embodiments, where the support interaction data includes an audio recording, the system may transcribe the audio recording into a textual transcript for analysis. The received corpus of support interaction data may include, for example, support interaction data having timestamps within a preset time window, which may overlap with a previous time window for which an analysis of the support interaction data was performed.

At block 220, the system receives a corpus of telemetry data from a plurality of computing systems. The corpus of telemetry data may include telemetry data related to an application 122, user activity within application 122, and/or telemetry data related to a computing system (e.g., a client device 120) on which application 122 executes. The telemetry data related to an application 122 may include information about actions performed by the application 122, debug information generated by the application 122 (e.g., stack traces, failed assertions, etc.), files downloaded by the application 122, and the like. Telemetry data related to the computing system on which application 122 executes may include hardware and software configuration information. In some embodiments, the corpus of telemetry data may include telemetry data having timestamps within the time window used to retrieve the corpus of support interaction data so that the support interaction data can be correlated with the telemetry data.

At block 230, the system identifies an incident for remediation from the corpus of support interaction and the telemetry data. Generally, the system identifies an incident for remediation based on correlations between anomalous increases in the frequency at which topics are referenced in the corpus of support interaction data and corresponding increases in the frequency at which a type of telemetry associated with a given topic is reported by the plurality of computing systems. For example, performance or usability issues with an application 122 may be correlated with telemetry data indicating that errors were encountered within application 122, while topics about malware infections may be correlated with telemetry data comprising the results of malware scans, network activity, file execution information, and the like. Based on the identification of an anomalous increase in the frequency at which a topic is referenced in the corpus of support interaction data and a corresponding anomalous increase in the frequency at which telemetry data related to the topic is received from the computing devices, the system can discover the emergence of an incident for remediation. The incident may be defined, for example, as a problem associated with the identified topic and the corresponding telemetry data.

At block 240, the system takes one or more actions to remedy the incident. In some embodiments, the system can analyze the corresponding telemetry data to identify the root cause of the incident and determine one or more remedial actions to perform on the computing devices to remedy the incident. For example, where the telemetry data indicates that users experiencing a particular issue have each installed a particular update or other application prior to reporting telemetry data corresponding to the topic, the system can infer that the installed update or other application cause the incident. Thus, the system can determine that a potential remedial action to perform includes uninstalling the update or other application, generate instructions to uninstall the update or other application, and push the generated instructions to one or more computing systems. In another example, some incidents may not be susceptible to automated remediation. The system may generate a report or notification to a specific group of developers or researchers who are responsible for developing remediation instructions for the issue. The notification may include, for example, information about the problems that have been reported by users in the support interaction data, telemetry data from the affected computing systems, and other information that may be useful in developing remediation instructions for the issue.

According to certain aspects, the incident to be remediated comprises a software performance issue in an application. The type of telemetry data corresponding to the software performance issue comprises telemetry indicating errors in the application.

According to certain aspects, the incident to be remediated comprises activity indicative of malware executing on a computing system in the plurality of computing systems. The type of telemetry data may comprise one or more of: event log data from the computing system, a list of processes executing on the computing system, or network activity data from the computing system.

According to certain aspects, the taking one or more actions to remedy the incident may include identifying, from the subset of the relevant set of telemetry data, a root cause of the incident defined by the topic and the subset of the relevant set of telemetry data, determining a remedial action to perform with respect to the identified root cause of the incident, identifying a subset of computing systems from the plurality of computing systems from which the subset of the relevant set of telemetry data was received, and pushing, to the subset of computing systems, instructions to perform the remedial action to remedy the incident on the subset of computing systems.

According to certain aspects, the taking one or more actions to remedy the incident may include identifying, from the subset of the relevant set of telemetry data, one or more common data points associated with computing systems from which the subset of the relevant set of telemetry data was received and a software application associated with the subset of the relevant set of telemetry data, generating a report including the topic and the one or more common data points, and transmitting the generated report to a developer responsible for the software application.

According to certain aspects, extracting the plurality of topics indicative of problems experienced by the plurality of users may include inputting the corpus of support interaction data into a machine learning model trained using a training data set comprising a first set of support interaction data labeled with an issue experienced by a user and an unlabeled second set of support interaction data, receiving, from the trained machine learning model, a predicted issue for each item in the corpus of support interaction data, and generating a list of predicted issues in the corpus of support interaction data and a frequency at which each issue in the list of predicted issues appears in the corpus of support interaction data.

According to certain aspects, the machine learning model comprises a neural network-based classifier configured to extract topics from natural language inputs.

According to certain aspects, discovering incidents across the plurality of computing systems for investigation may further include identifying a geographical region common to the identified topic. The extracted relevant set of telemetry data may further comprise telemetry data from computing systems located in the identified geographical region.

According to certain aspects, discovering incidents across the plurality of computing systems for investigation may further include identifying a time from which a rate of occurrences of the identified topic in the corpus of support interaction data increases from a baseline rate. The extracted relevant set of telemetry data may further include telemetry data having a timestamp at or later than the identified time.

Figure 3:
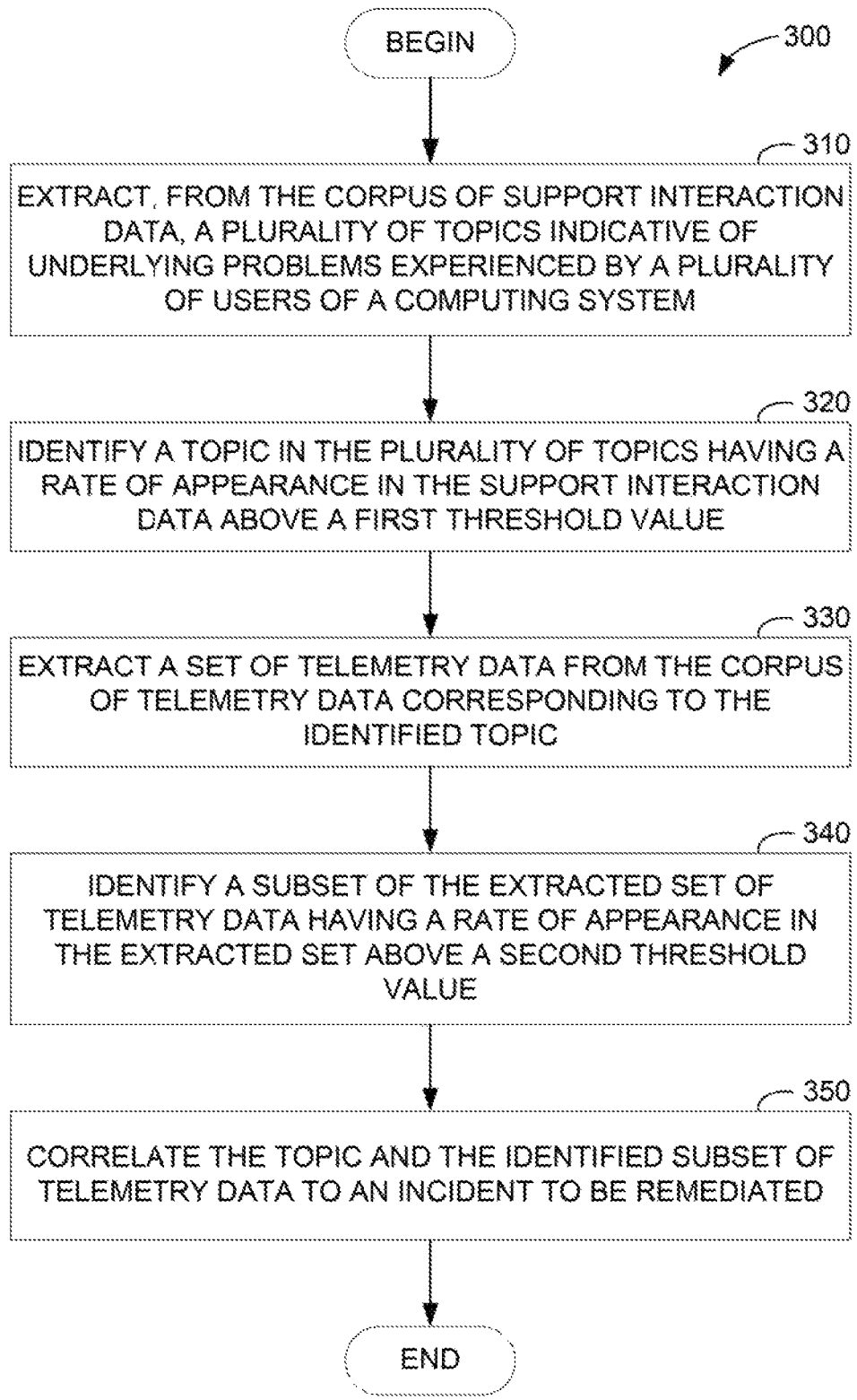
FIG. 3 illustrates example operations for correlating topics discovered in customer support interaction data to computer system telemetry data to discover an incident to be remediated on a plurality of computing systems, according to one embodiment.

FIG. 3 illustrates example operations 300 for identifying an incident for remediation from the corpus of support interaction data and the telemetry data, according to an embodiment. Operations 300 generally represent operations performed at block 230 in FIG. 2. As illustrated, operations 300 begin at block 310, where a system extracts, from the corpus of support interaction data, a plurality of topics indicative of underlying problems experienced by a plurality of users of a computing system. The corpus of support interaction data may be retrieved from support interaction data repository 160 illustrated in FIG. 1. Generally, the system uses a trained topic identifier to extract the topics from the corpus of support interaction data. The trained topic identifier may be trained, as discussed above, to identify relevant words in each entry in the corpus of support interaction data and assign a topic to each entry in the corpus of support interaction data. The assigned topic may represent an underlying problem within or otherwise related to application 122 causing the user to initiate a support session.

At block 320, the system identifies a topic in the plurality of topics having a rate of appearance in the corpus of support interaction data above a first threshold value. As discussed, the system can generate a list including each topic identified in the support interaction data and a corresponding frequency of appearance in the support interaction data. The system generally maintains a baseline frequency for each topic that may be calculated from historical rates at which users invoke support sessions to resolve issues related to each topic, and a threshold value for each topic may be calculated as some amount in excess of the baseline frequency for that topic. If the frequency at which a topic is included in the corpus of support interaction data exceeds the threshold value for that topic, the system can flag the topic for further investigation against telemetry data corresponding to the topic.

At block 330, the system extracts a set of telemetry data from the corpus of telemetry data corresponding to the identified topic. The set of telemetry data may be extracted from telemetry data repository 170 illustrated in FIG. 1. The extracted set of telemetry data may comprise telemetry data having timestamps within the time window used to identify topics in support interaction data for analysis and may comprise telemetry data determined a priori based on mapping between topics identified by a support data analyzer and types of telemetry generated by application 122. Further, the extracted set of telemetry data may include telemetry data generated by computing devices associated with users generating support interaction data including the identified topic At block 340, the system identifies a subset of the extracted set of telemetry data having a rate of appearance in the extracted set above a second threshold value. In some embodiments, the subset of the extracted set of telemetry data may be analyzed along multiple dimensions to identify specific types of users or client devices that are reporting telemetry associated with the identified issue at a rate exceeding a baseline rate. The baseline rate may be determined from the historical frequency at which the telemetry data is reported by the computing systems absent any underlying issues with an application 122 or on a computing system executing application 122. In some embodiments, the baseline rate may be calculated as a probability that a computing device would report a particular type of telemetry correlated with the identified topic.

At block 350, the system correlates the topic and the identified subset of telemetry data to an incident to be remediated. Generally, the system may examine the identified subset of telemetry data to identify common data points in the subset of telemetry data based on an inference that the common data points may be related to the identified topic (e.g., the underlying problem with or related to application 122 causing users to initiate support sessions with the provider of application 122). The topic may be correlated with the common data points in the identified subset of telemetry data, and the topic and common data points in the identified subset of telemetry data may be provided to an incident analysis system for further analysis and, in some embodiments, generation of remediation instructions to address the incident to be remediated.

Figure 4:
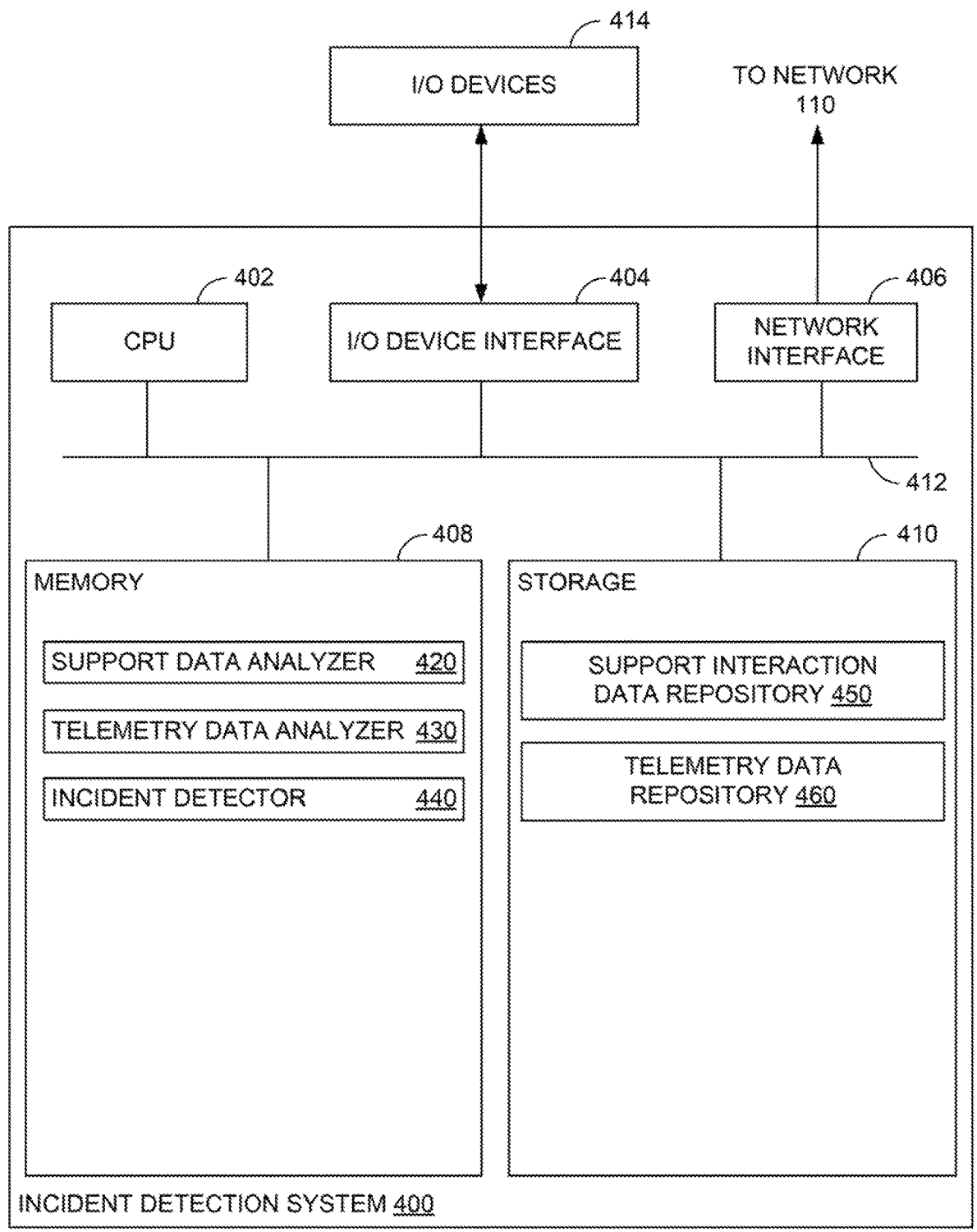
FIG. 4 illustrates an example computing system for discovering incidents to be remediated on a plurality of computing systems based on correlations between customer support interaction data and computer system telemetry data, according to one embodiment.

FIG. 4 illustrates an example incident detection system 400 that uses correlations between topics referenced in support interaction data and telemetry data from a plurality of computing devices to discover emerging incidents for remediation, according to an embodiment. As shown, the incident detection system 400 includes, without limitation, a central processing unit (CPU) 402, one or more I/O device interfaces 404 which may allow for the connection of various I/O devices 414 (e.g., keyboards, displays, mouse devices, pen input, etc.) to the incident detection system 400, network interface 406, a memory 408, storage 410, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, memory 408, and storage 410. CPU 402 is included to be representative of a single CPU, multiple CPUs, a single CPU having multiple processing cores, and the like. I/O device interface 404 may provide an interface for capturing data from one or more input devices integrated into or connected to incident detection system 400, such as keyboards, mice, touchscreens, and so on. Additionally, the memory 408 is included to be representative of a random access memory. Furthermore, the storage 410 may be a disk drive. Although shown as a single unit, the storage 410 may be a combination of fixed and/or removable storage devices, such as fixed disc drives, removable memory cards or optical storage, network attached storage (NAS), or a storage area-network (SAN).

As shown, memory 408 includes a support data analyzer 420, a telemetry data analyzer 430, and an incident detector 440. Support data analyzer 420 uses one or more machine learning models, which may be trained by incident detection system 400 or another computing system, to extract relevant words from support interaction data (e.g., transcripts of support sessions, community support posts, etc. stored in support interaction data repository 450 on incident detection system 400 or at a remote location) and associate topics with the extracted relevant words. The topics may be indicative of an underlying problem experienced by a user who initiated a support session with technical support staff associated with a provider of an application (e.g., application 122 illustrated in FIG. 1). Support data analyzer 420 can examine a distribution of the topics included in a corpus of support interaction data to identify topics having a rate of appearance in the corpus of support interaction data exceeding a baseline rate and provide the identified topics to telemetry data analyzer 430 for further analysis.

Telemetry data analyzer 430 generally uses the identified topics to identify a relevant set of telemetry data to analyze and subsets of the relevant set of telemetry data having increases in the frequency of reporting corresponding to the increases in references to the identified topic in the support interaction data. Telemetry data analyzer 430 can extract a relevant set of telemetry data from a telemetry data store (e.g., telemetry data repository 460 on incident detection system 400 or at a remote location) based on a priori defined mappings between an identified topic and a type of telemetry associated with the identified topic. From the relevant set of telemetry data, telemetry data analyzer 430 can analyze the telemetry data along a plurality of dimensions corresponding to different hardware and software configurations of a computing device (and, therefore, different risk profiles) to identify specific subsets of telemetry data having an increased reporting frequency mirroring the increased frequency at which the identified topic is referenced in support interaction data.

Incident detector 440 uses the identified topic and the subset of the relevant set of telemetry data to identify probable causes of an emerging incident and take one or more actions to remedy the emerging incident. For example, incident detector can examine each item of telemetry data in the subset of the relevant set of telemetry data to identify common data points shared by the computing systems that generated the subset of the relevant set of telemetry data. The identified topic (which may be related to an underlying problem experienced by users of an application) and the common data points in the telemetry data may be used to take one or more actions to remediate the incident. These actions may include generating a report including at least the identified topic and the common data points for transmission to one or more development teams responsible for developing remediation instructions for the incident, or automatically generating remediation instructions for the incident.

As shown, storage 410 includes a support interaction data repository 450 and a telemetry data repository 460. Support interaction data repository 450 generally provides a repository for storing textual and non-textual content related to user support interactions, which, as discussed above, may be used to identify topics (e.g., underlying problems with or related to an application 122) for further investigation. Telemetry data repository 460 generally provides a repository for storing information transmitted by client devices 120 related to an application 122 executing on the client devices 120 for use in identifying emerging issues on a plurality of computing systems based on correlations between increases in a frequency at which a topic is identified in support interaction data and increases in a frequency at which types of telemetry associated with the topic are reported by the client devices 120.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for discovering and remediating incidents across a plurality of computing systems for investigation based on support interaction and telemetry data, comprising:

receiving a corpus of support interaction data from a plurality of users;

receiving a corpus of telemetry data from the plurality of computing systems;

extracting, from the corpus of support interaction data, a plurality of topics indicative of problems experienced by the plurality of users;

identifying a topic in the plurality of topics having a rate of appearance in the corpus of support interaction data above a threshold value;

extracting a relevant set of telemetry data from the corpus of telemetry data, wherein the relevant set of telemetry data comprises telemetry data generated by computing devices associated with users generating support interaction data including the identified topic;

identifying a subset of the relevant set of telemetry data having a rate of appearance in the relevant set of telemetry data above a second threshold value;

correlating the topic and the subset of the relevant set of telemetry data to an incident to be remediated; and taking one or more actions to remedy the incident to be remediated.

2. The method of claim 1, wherein the incident to be remediated comprises a software performance issue in an application, and wherein a type of telemetry data corresponding to the software performance issue comprises telemetry data indicating errors in the application.

3. The method of claim 1, wherein the incident to be remediated comprises activity indicative of malware executing on a computing system in the plurality of computing systems.

4. The method of claim 3, wherein the type of telemetry data comprises one or more of: event log data from the computing system, a list of processes executing on the computing system, or network activity data from the computing system.

5. The method of claim 1, wherein the taking one or more actions to remedy the incident comprises:

identifying, from the subset of the relevant set of telemetry data, a root cause of the incident defined by the topic and the subset of the relevant set of telemetry data;

determining a remedial action to perform with respect to the identified root cause of the incident;

identifying a subset of computing systems from the plurality of computing systems from which the subset of the relevant set of telemetry data was received; and pushing, to the subset of computing systems, instructions to perform the remedial action to remedy the incident on the subset of computing systems.

6. The method of claim 1, wherein the taking one or more actions to remedy the incident comprises:

identifying, from the subset of the relevant set of telemetry data, one or more common data points associated with computing systems from which the subset of the relevant set of telemetry data was received and a software application associated with the subset of the relevant set of telemetry data;

generating a report including the topic and the one or more common data points; and transmitting the generated report to a developer responsible for the software application.

7. The method of claim 1, wherein extracting the plurality of topics indicative of problems experienced by the plurality of users comprises:

inputting the corpus of support interaction data into a machine learning model trained using a training data set comprising a first set of support interaction data labeled with an issue experienced by a user and an unlabeled second set of support interaction data;

receiving, from the trained machine learning model, a predicted issue for each item in the corpus of support interaction data; and generating a list of predicted issues in the corpus of support interaction data and a frequency at which each issue in the list of predicted issues appears in the corpus of support interaction data.

8. The method of claim 7, wherein the machine learning model comprises a neural network-based classifier configured to extract topics from natural language inputs.

9. The method of claim 1, further comprising:
identifying a geographical region common to the identified topic, wherein the extracted relevant set of telemetry data further comprises telemetry data from computing systems located in the identified geographical region.

10. The method of claim 1, further comprising:
identifying a time from which a rate of occurrences of the identified topic in the corpus of support interaction data increases from a baseline rate, wherein the extracted relevant set of telemetry data further comprises telemetry data having a timestamp at or later than the identified time.

11. A system comprising:
a processor; and
a memory having instructions stored thereon which, when executed by the processor, perform an operation for discovering and remediating incidents across a plurality of computing systems for investigation based on support interaction and telemetry data, the operation comprising:
receiving a corpus of support interaction data from a plurality of users;
receiving a corpus of telemetry data from the plurality of computing systems;
extracting, from the corpus of support interaction data, a plurality of topics indicative of problems experienced by the plurality of users;
identifying a topic in the plurality of topics having a rate of appearance in the corpus of support interaction data above a threshold value;
extracting a relevant set of telemetry data from the corpus of telemetry data, wherein the relevant set of telemetry data comprises telemetry data generated by computing devices associated with users generating support interaction data including the identified topic;
identifying a subset of the relevant set of telemetry data having a rate of appearance in the relevant set of telemetry data above a second threshold value;
correlating the topic and the subset of the relevant set of telemetry data to an incident to be remediated; and
taking one or more actions to remedy the incident to be remediated.

12. The system of claim 11, wherein the incident to be remediated comprises a software performance issue in an application, and wherein a type of telemetry data corresponding to the software performance issue comprises telemetry data indicating errors in the application.

13. The system of claim 11, wherein the incident to be remediated comprises activity indicative of malware executing on a computing system.

14. The system of claim 11, wherein the taking one or more actions to remedy the incident comprises:
identifying, from the subset of the relevant set of telemetry data, a root cause of the incident defined by the topic and the subset of the relevant set of telemetry data;
determining a remedial action to perform with respect to the identified root cause of the incident;
identifying a subset of computing systems from the plurality of computing systems from which the subset of the relevant set of telemetry data was received; and
pushing, to the subset of computing systems, instructions to perform the remedial action to remedy the incident on the subset of computing systems.

15. The system of claim 11, wherein the taking one or more actions to remedy the incident comprises:
identifying, from the subset of the relevant set of telemetry data, one or more common data points associated with computing systems from which the subset of the relevant set of telemetry data was received and a software application associated with the subset of the relevant set of telemetry data;
generating a report including the topic and the one or more common data points; and
transmitting the generated report to a developer responsible for the software application.

16. The system of claim 11, wherein extracting the plurality of topics indicative of problems experienced by the plurality of users comprises:
inputting the corpus of support interaction data into a machine learning model trained using a training data set comprising a first set of support interaction data labeled with an issue experienced by a user and an unlabeled second set of support interaction data;
receiving, from the trained machine learning model, a predicted issue for each item in the corpus of support interaction data; and
generating a list of predicted issues in the corpus of support interaction data and a frequency at which each issue in the list of predicted issues appears in the corpus of support interaction data.

17. The system of claim 16, wherein the machine learning model comprises a neural network-based classifier configured to extract topics from natural language inputs.

18. The system of claim 11, further comprising:
identifying a geographical region common to the identified topic, wherein the extracted relevant set of telemetry data further comprises telemetry data from computing systems located in the identified geographical region.

19. The system of claim 11, further comprising:
identifying a time from which a rate of occurrences of the identified topic in the corpus of support interaction data increases from a baseline rate, wherein the extracted relevant set of telemetry data further comprises telemetry data having a timestamp at or later than the identified time.

20. A non-transitory computer-readable medium having instructions stored thereon which, when executed by a processor, perform an operation for discovering and remediating incidents across a plurality of computing systems for investigation based on support interaction and telemetry data, the operation comprising:
receiving a corpus of support interaction data from a plurality of users;
receiving a corpus of telemetry data from the plurality of computing systems;
extracting, from the corpus of support interaction data, a plurality of topics indicative of problems experienced by the plurality of users;
identifying a topic in the plurality of topics having a rate of appearance in the corpus of support interaction data above a threshold value;
extracting a relevant set of telemetry data from the corpus of telemetry data, wherein the relevant set of telemetry data comprises telemetry data generated by computing devices associated with users generating support interaction data including the identified topic;
identifying a subset of the relevant set of telemetry data having a rate of appearance in the relevant set of telemetry data above a second threshold value;

correlating the topic and the subset of the relevant set of telemetry data to an incident to be remediated; and taking one or more actions to remedy the incident to be remediated.

\* \* \* \* \*